Sept. 23, 1952  J. FOSSA  2,611,141
LASTING MACHINE
Filed March 11, 1950  2 SHEETS—SHEET 1

Inventor
Joseph Fossa
By his Attorney

Sept. 23, 1952 J. FOSSA 2,611,141
LASTING MACHINE
Filed March 11, 1950 2 SHEETS—SHEET 2
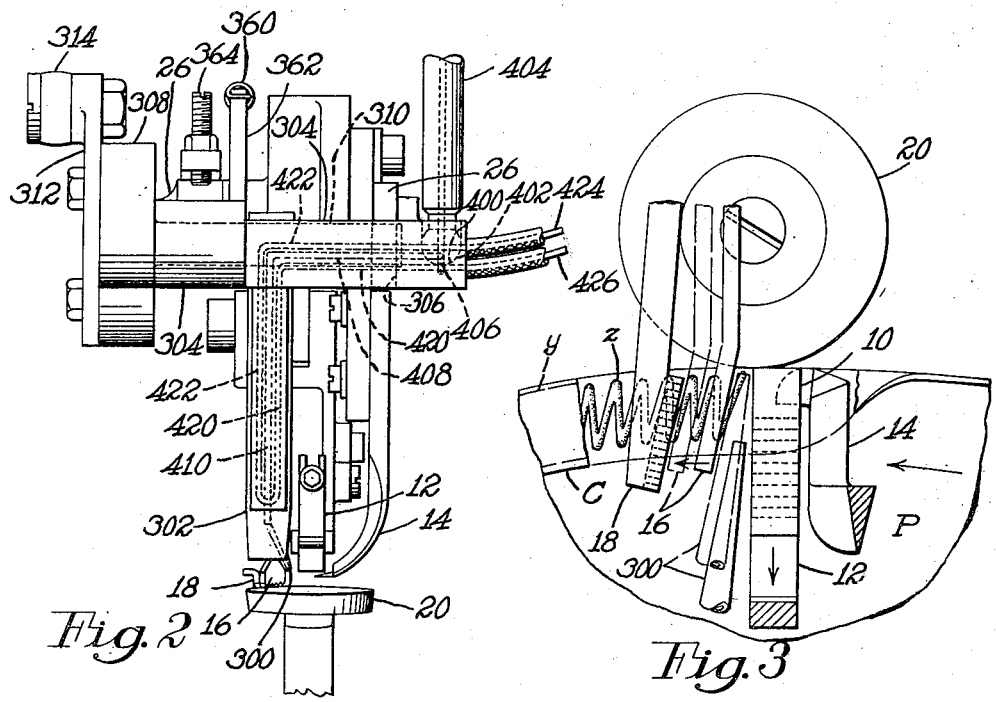
Fig. 2
Fig. 3
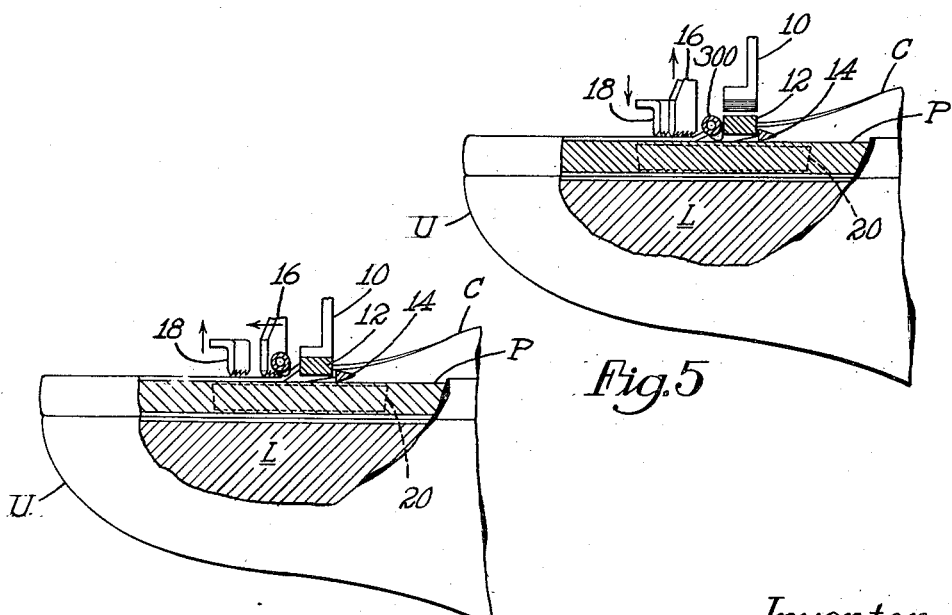
Fig. 4
Fig. 5
Inventor
Joseph Fossa
By his Attorney Patented Sept. 23, 1952

2,611,141

UNITED STATES PATENT OFFICE 2,611,141

LASTING MACHINE

Joseph Fossa, Hamilton, Mass., assignor to United Shoe Machinery Corporation, Flemington, N. J., a corporation of New Jersey Application March 11, 1950, Serial No. 149,188

8 Claims. (Cl. 12—1)

This invention relates to lasting machines and particularly to a machine for lasting progressively with an adhesive in which the adhesive is applied during the lasting operation. Although herein illustrated as embodied in a lasting machine of the type disclosed in United States Letters Patent No. 2,411,827, issued on November 26, 1946, in the name of Joseph Fossa, it will be understood that the invention is of broader utility and not limited to use in a machine of the exact mechanical structure shown in that patent.

In United States Letters Patent No. 2,476,290, issued on July 19, 1949, in the name of Joseph Fossa, there is illustrated a progressive lasting machine, having means for tensioning the stock to be lasted, progressively, in different locations along the marginal edge of the bottom of a shoe, pressing the lasting margin of the tensioned stock against the bottom of the shoe and for feeding the shoe, which is also provided with means for extruding heated thermoplastic adhesive onto the bottom of the shoe during the lasting operation and, in one aspect, the present invention is an improvement on the machine shown in that patent. In the patented construction, the shoe-bottom rest of the lasting machine, over which the lasting margin of the stock is drawn by an intermittently operating gripper, is provided with suitable passages so as to serve also as a nozzle through which the adhesive is extruded in a location adjacent to the gripper but on the side opposite to a pressing means which is spaced lengthwise of the shoe from the gripper and also operates to feed the shoe. While this arrangement has proved to be generally satisfactory, it has the disadvantage that, due to the location at which the adhesive is applied, there will be a portion of the lasting margin of the stock which will not be secured adhesively to the bottom of the shoe, at the beginning of each lasting operation. Also, the width of the band of adhesive that is applied to the shoe bottom is necessarily predetermined by the width of the opening which is provided in the shoe-bottom rest and through which the adhesive is extruded.

It is an object of this invention to provide a novel lasting machine of the aforementioned type having an improved adhesive-applying nozzle which is so arranged as to apply the adhesive to the bottom of a shoe being lasted in a location closely adjacent to the pressing means and adapted also to facilitate a variation in the width of the band of adhesive so applied. With these objects in view, and in accordance with a feature of the invention, the herein illustrated lasting machine has a reciprocating adhesive-applying nozzle which is adapted to apply adhesive to the bottom of the shoe in a location close to the gripper and on the same side as the pressing means. More particularly, the nozzle is reciprocated in directions extending widthwise of the shoe, in time relation to the action of the gripper and also to the action of the pressing member, so as to apply the adhesive in the form of a thread-like portion in a location directly beneath that part of the lasting margin of the stock which extends, lengthwise of the shoe, between the tensioning means, i. e., the gripper, and the pressing means. As the shoe is fed along during the lasting operation, the thread-like portion of adhesive is applied by the reciprocating nozzle in a curved line, extending back and forth from a location adjacent to the edge of the shoe bottom, that is pressed into a continuous band of adhesive by the subsequent action of the pressing means. With this arrangement, the adhesive is applied to the bottom of the shoe in a location just ahead of the pressing means and is, therefore, immediately available for securing the lasting margin of the stock to the bottom of the shoe at the very beginning of the lasting operation.

The machine of this invention is further provided with mechanism for increasing or decreasing the amplitude of the reciprocating movements of the nozzle so as to vary the width of the band of adhesive to accommodate different operating conditions. In the herein illustrated machine, the nozzle is preferably reciprocated by mechanism which is under the control of the treadle by means of which the machine is started and stopped and the arrangement is such that reciprocation of the nozzle is suspended, and the nozzle moved to an inoperative position, when when the machine is brought to a stop.

The above and other objects and features of the invention will appear in the following detailed description of the preferred embodiment thereof, illustrated in the accompanying drawings, and will be pointed out in the claims.

In the drawings,

Fig. 2 is a view in front elevation of the operating elements of the machine shown in Fig. 1;

Fig. 3 is a plan view showing the operating elements of the machine, together with a portion of a shoe being lasted; and Figs. 4 and 5 are views, in front elevation, of the operating elements of the machine and a shoe being lasted illustrating, diagrammatically, different positions assumed by these elements during an operating cycle.

Figure 1:
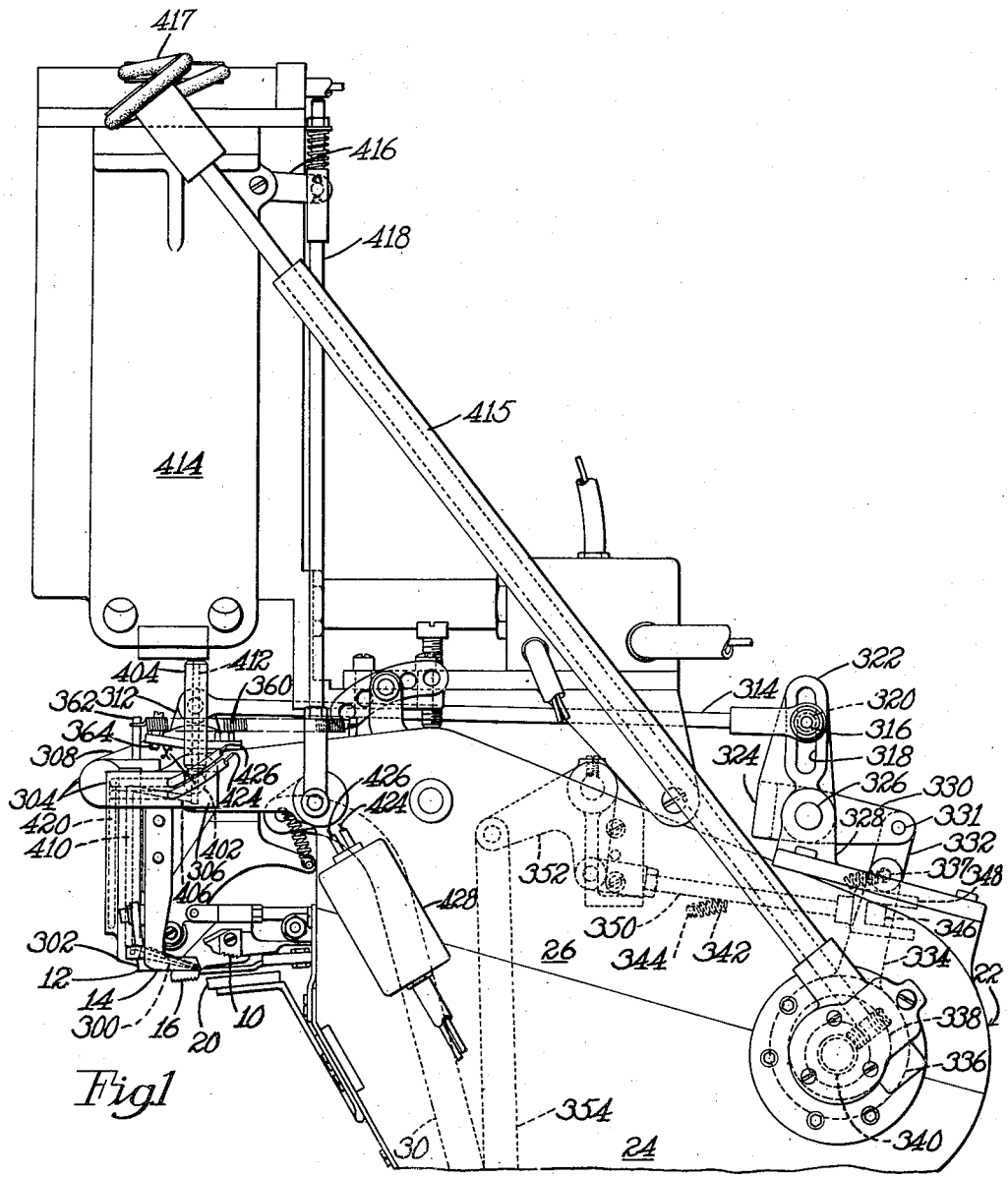
Fig. 1 is a view, in side elevation, of a lasting machine embodying the features of this invention.

Referring to the drawings, the lasting machine therein illustrated is of the kind disclosed in United States Letters Patent No. 2,411,827, referred to above, modified in certain respects as shown in United States Letters Patent Nos. 2,472,816 and 2,476,970, issued, respectively, on June 14, 1949, and July 26, 1949, also in the name of Joseph Fossa. Thus this lasting machine is provided with an upper-tensioning gripper, comprising jaws 10 and 12, a shoe-bottom rest 14, a presser-feed-foot 16, a feed-retaining finger 18 and an edge guide roll 20. The gripper, presser feed foot and feed-retaining finger operate in the manner set forth in detail in Patent No. 2,411,827, the particular mechanical construction of the gripper mechanism being the same as that shown in Patent No. 2,472,816, while the shoe-bottom rest and its operating mechanism, including a treadle-operated rod, or link, 30 corresponds to that disclosed in Patent No. 2,476,970. As in the machines of these prior patents, these various elements are associated with, and actuated by mechanism contained within, a hollow head construction indicated generally by the reference character 22 and including a lower portion 24 and a removable cover 26.

The lasting machine illustrated in the drawings is also provided with a reciprocating nozzle member 300 for applying heated thermoplastic adhesive to the bottom of a shoe during the lasting operation. Referring particularly to Fig. 2, the nozzle 300 is secured to the lower end of an arm 302 that extends downwardly from a U-shaped member 304 having rearwardly extending portions 306, 308. Formed integrally with the rearwardly extending portion 308 of the U-shaped member, is a shaft 310 that is journaled in forwardly extending portions of the cover 26. The shaft 310 also supports the gripper jaw 12 and the shoe-bottom rest 14, thus serving the same purpose as the cross shaft 32 shown in Fig. 3 of Patent No. 2,472,816. The arm 302 is, therefore, mounted for oscillation about the same axis (indicated by the reference character $x$ in Fig. 1) as that about which the shoe-bottom rest 14 pivots when it is moved to and from the operating position shown in Fig. 1, by means of the rod, or link, 30 and in the manner described in Patents Nos. 2,472,816 and 2,476,970, referred to above.

During the operation of the machine, the arm 302 is oscillated so as to reciprocate the nozzle 300, in time relation to the actions of the operating elements of the lasting machine, by means of the following mechanism. Secured to the rearwardly extending portion 308 of the U-shaped member 304 is a lever arm 312 and connected to this lever arm is one end of a link 314, Figs. 1 and 2. The opposite end of this link is adjustably connected, by means of a stud 316, arcuate slot 318 and clamp nut 320, to one arm 322 of a bell-crank lever 324, Fig. 1. This bell-crank lever is pivotally mounted, by means of a shaft 326, on a bracket 328 that is secured to the cover 26, and has a second arm 330. A link 332 is connected to the arm 330 by means of a pin 331 and to a second link 334, which is formed integrally with an eccentric strap 336, by means of a pin 337. The strap 336 is mounted on an eccentric 338 which is carried by the main drive shaft 340 of the machine. A coil spring 342 is stretched between the pin 337 and a pin 344 mounted in the cover member 26. Embracing a block 346, carried by the link 334, is a yoke member 348 which is mounted on one end of a rod 350. At its opposite end, this rod is connected to one arm of a bell-crank lever 352. A link 354, connected to the other arm of the bell-crank lever 352, extends downwardly and is connected to the treadle-operated rod, or link, 30.

When the treadle, not shown, of the lasting machine is depressed, the shoe-bottom rest is moved to the operating position shown in Fig. 1 by the rod, or link, 30 which corresponds to the rod 48 of Patent No. 2,472,816 and link 196 of Patent No. 2,476,970, in the manner explained in these patents. Also, the downward movement of the link 354, which accompanies depression of the treadle, moves the rod 350 to a position to hold the toggle which is formed by the links 332, 334 straightened so that the nozzle 300 will be oscillated by the eccentric 338 in a manner that will be apparent. Upon release of the treadle, however, the link 354 will be elevated, by the treadle spring not shown, and the rod 350 will be drawn over to the left, as viewed in Fig. 1, by the bell-crank lever 352. The toggle formed by the links 332, 334 will now be broken by the action of spring 342, which will hold the link 334 in a position where the block 346 is in engagement with the bottom of the fork member 348. A coil spring 360, stretched between the cover 26 and a pin 362 mounted on a portion of the U-shaped member 304, will now swing the nozzle to an idle position determined by a stop screw 364, Fig. 2, and the movements of the link 334, by eccentric 338 will be absorbed by a pivoting of the link 332 about the pin 331 without effecting movement of the bell-crank lever 324 or of the nozzle 300.

Heated adhesive is supplied to the nozzle 300 in the following manner. The rearwardly extending portion 306 of the U-shaped member 304 is provided with a suitably shaped recess 400 to receive a spherically shaped end 402 formed on a pipe 404, Fig. 2. The portion 306, member 304 and arm 302, are provided with passages 406, 408 and 410 which connect the nozzle 300 with the recess 400, Figs. 1 and 2. The pipe 404, which is provided with a bore 412, is connected at its upper end to a suitable source of heated thermoplastic adhesive under pressure, herein illustrated, by way of an example, as being apparatus for dispensing heated thermoplastic adhesive under pressure of the type disclosed in detail in United State Letters Patent No. 2,544,661, granted March 13, 1951, in the name of Joseph Fossa. Briefly described, this apparatus includes a container 414, in which thermoplastic adhesive is melted out of its container and delivered to the pipe 404 by means of a pump, not shown, but driven from the main shaft 340 of the lasting machine through a telescoping shaft 415 and belt 417. As is explained in detail in the aforementioned patent, this apparatus is provided with a by-pass valve, not shown, which is under the control of a lever 416 and rod 418. The arrangement is such that, when the treadle of the lasting machine is depressed, the by-pass valve is closed, thus causing the pump to deliver heated thermoplastic adhesive to the pipe 404 while, when the treadle is released, the by-pass valve is opened so as to direct the output of the pump back into the container, thus cutting off flow into the pipe 404. If desired, the somewhat similar adhesive dispensing apparatus shown in United States Letters Patent No. 2,476,290, referred to above, could be substituted for the arrangement illustrated herein, the spout 312 of this patented apparatus corresponding to the pipe 404 of the construction herein illustrated.

In order that the adhesive flowing through the passages 406, 408 and 410, and emerging from the nozzle 300, may be maintained at the proper temperature, the following arrangement is provided. A low voltage heating coil, formed in the shape of a loop 420, 422 and suitably insulated is set into the arm 302 and U-shaped member 304, and connected to leads 424, 426. These leads are, in turn, connected through a junction box 428 to a suitable source of electrical energy, not shown.

Referring to Figs. 3, 4 and 5, the gripper jaws 10, 12, presser-feed foot 16 and feed-retaining finger 18 operate in the same manner as the corresponding elements of the machines shown in Patents Nos. 2,411,827, 2,472,816 and 2,476,970, referred to above. Thus, the reciprocating gripper jaws operate, intermittently, to tension the stock being lasted, herein illustrated as the cover C of a slip-lasted shoe comprising an upper U assembled on a last L with a platform P, by drawing its lasting margin inwardly over the bottom of the shoe, see arrow Fig. 3, while the presser-feed-foot operates in time relation to the action of the gripper jaws to press the lasting margin against the bottom of the shoe, in a location closely adjacent to the gripper jaws and shoe-bottom rest, and, while in pressing engagement with the shoe, to move in a direction to feed the shoe, see arrow in Figs. 3 and 4. During the feeding action of the presser-feed foot, the gripper jaws are opened and returned for engagement with the next succeeding portion of the lasting margin of the stock and the feed retainer is elevated in the direction of the arrow, Fig. 4. At the conclusion of a feeding action the presser-feed-foot is elevated, see arrow Fig. 5, and returned to its starting position, during which time the shoe is held against retrograde movement by the feed retainer 18, and the gripper jaws tension the next succeeding portion of the stock. The exact timing of the operation of these operating elements is explained more clearly in Patent No. 2,411,827, see Fig. 8 thereof, to which reference may be made for details not herein set forth.

As shown in Fig. 3, the nozzle 300 is located between the gripper jaws 10, 12 and the presser-feed-foot 16, and this nozzle is reciprocated toward and away from a position adjacent to the edge of the bottom of the shoe being lasted. As a result of these reciprocating movements of the nozzle and the intermittent feeding of the shoe by the presser-feed-foot, the adhesive which is extruded from the nozzle is applied to the shoe bottom in the form of a thread-like line z which has a curved or zigzag shape, as shown in Fig. 3. However, the adjacent portions of this curve, or zigzag feed are so closely spaced, because of the relatively short feeding increments of the presser-feed-foot, that they merge under the pressure applied by the presser-feed-foot and feed retainer so as to form a continuous band of adhesive, indicated by the reference character y in Fig. 3, for securing the lasting margin of the tensioned stock in lasted position to the bottom of the shoe. It will be understood, of course, that this continuous band would start right at the presser-feed-foot 16, the lasting margin C being broken away in Fig. 3 to illustrate the shape of the thread-like line of adhesive applied by the nozzle.

As will be apparent, the width of this band of adhesive will be substantially equal to the amplitude of the reciprocating movements of the nozzle. Hence, by increasing or decreasing the amplitude of the reciprocating movements of the nozzle, the width of the adhesive band may be varied to accommodate different operating conditions. As explained above, the link 314 is adjustably connected to the arm 322 of the bell-crank lever 324. When this link is moved outwardly, to the outer end of the slot 318, since the angular movement of the lever 324 remains constant, the amplitude of the oscillation of the arm 302, and hence the amplitude of the reciprocation of the nozzle 300, will be increased to a maximum extent. On the other hand, if the link is moved inwardly to the inner end of the slot, the nozzle will be reciprocated with a minimum amplitude. The slot 318 is arcuate in shape and has its center of curvature located at the point of connection of the link to the lever arm 312, when the parts are in the positions shown in Fig. 1 and with the nozzle located at its innermost position shown in dotted line in Fig. 3. Hence, regardless of the amplitude of its reciprocation, the nozzle will always travel inwardly to the same position, relatively to the edge of the bottom of a shoe being lasted, and the inner edge of the band of adhesive, whatever its width, will always be located close to the edge of the shoe bottom.

Referring again to Figs. 3–5, the reciprocations of the nozzle 300 occur in a definite time relation to the actions of the operating elements of the lasting machine and particularly of the presser-feed-foot 16 and gripper jaws 10, 12. Thus, at the conclusion of each tensioning action of the gripper jaws and just as the presser-feed-foot descends into pressing engagement with the stock, the nozzle is in its outward position, see Fig. 4 and solid lines in Fig. 3. As the gripper jaws open and return, and while the shoe is being fed along by the presser-feed-foot, the nozzle moves inwardly and reaches the position shown in Fig. 5 and in dotted line in Fig. 3 just at the completion of the feeding movement of the shoe. Now, during the next tensioning action of the gripper jaws and while the presser-feed-foot is elevated and returning to its starting position, the nozzle is returned to its outward location, thus completing an operating cycle. It will be observed that at the beginning of a feeding movement of the shoe, see Fig. 4, the lasting margin of the cover C is drawn down to the shoe bottom in a location close to the gripper jaws so that no space is left for insertion of the nozzle beneath the stock. However, as the presser-feed-foot moves the shoe along and away from the opening gripper jaws, a space is opened up beneath the stock so that the nozzle can readily enter. By thus timing the reciprocations of the nozzle to the actions of the presser-feed-foot and the gripper jaws, it is possible to apply the adhesive to the bottom of the shoe in the most favorable location, i. e., just immediately ahead of the presser-feed-foot and directly beneath that part of the lasting margin of the stock that extends, lengthwise of the shoe, between the gripper and pressing member. When the adhesive is applied to the shoe bottom in this location, it is available just as soon as the lasting machine is started in operation. On the other hand, when the adhesive is applied to the shoe bottom in a location remote from the presser-feed-foot, an initial portion of the lasting margin of the stock will not be secured to the shoe bottom because of the absence of any adhesive under that portion of the stock.

Having described the invention, what is claimed as new and desired to secure by Letters Patent of the United States is:

1. A machine for lasting with adhesive having, in combination, a power-operated gripper for intermittently tensioning stock to be lasted, progressively, in different locations along the marginal edge of the bottom of a shoe, means, spaced from the gripper in a direction lengthwise of the shoe, for pressing the lasting margin of the tensioned stock against the bottom of the shoe, an adhesive applying nozzle, and means for reciprocating said nozzle in directions extending widthwise of the shoe, in time relation to the action of said gripper, to cause the nozzle to apply adhesive to the bottom of the shoe in a location directly beneath that part of the lasting margin of the stock which extends, lengthwise of the shoe, between the gripper means and the pressing means.

2. A machine for lasting with adhesive having, in combination, a member for engaging the bottom of a shoe adjacent to the marginal edge thereof, a power-operated gripper for intermittently tensioning stock to be lasted, progressively, in different locations along the marginal edge of the bottom of the shoe by drawing its lasting margin inwardly from the edge of the shoe bottom and over said shoe-bottom-engaging member, means, spaced from the gripper in a direction lengthwise of the shoe, for pressing the lasting margin of the tensioned stock against the bottom of the shoe, an adhesive-applying nozzle, and means for reciprocating said nozzle in directions extending widthwise of the shoe, in time relation to the action of said gripper, to cause the nozzle to apply adhesive to the bottom of the shoe in a location directly beneath that part of the lasting margin of the stock which extends, lengthwise of the shoe, between the gripper and the pressing means.

3. A machine for lasting with adhesive having, in combination, a power-operated gripper for intermittently tensioning the stock to be lasted, progressively, in different locations along the marginal edge of the bottom of a shoe, an intermittently operating presser member, spaced from the gripper in a direction lengthwise of the shoe, for pressing the lasting margin of the tensioned stock against the bottom of the shoe, an adhesive-applying nozzle, and means for reciprocating said nozzle in directions extending widthwise of the shoe, in time relation to the actions of said gripper and said presser member, to cause the nozzle to apply adhesive to the bottom of the shoe in a location directly beneath that part of the lasting margin of the stock which extends, lengthwise of the shoe, between the gripper and the presser member.

4. A machine for lasting with adhesive having, in combination, a power-operated gripper for intermittently tensioning the stock to be lasted, progressively, in different locations along the marginal edge of the bottom of a shoe, an intermittently operating presser member, spaced from the gripper in a direction lengthwise of the shoe, for pressing the lasting margin of the tensioned stock against the bottom of the shoe and for feeding the shoe, an adhesive-applying nozzle, and means for reciprocating said nozzle in directions extending widthwise of the shoe, in time relation to the actions of said gripper and said presser member, to cause the nozzle to apply adhesive to the bottom of the shoe in a location directly beneath the part of the lasting margin of the stock which extends, lengthwise of the shoe, between the gripper and the presser member.

5. A machine for lasting with adhesive having, in combination, a power-operated gripper for intermittently tensioning the stock to be lasted, progressively, in different locations along the marginal edge of the bottom of a shoe, means for pressing the lasting margin of the tensioned stock against the bottom of the shoe, a nozzle for applying adhesive in the form of a thread-like portion, means for reciprocating said nozzle in directions extending widthwise of the shoe to cause said thread-like portion of adhesive to be applied to the shoe bottom along a curved line, extending back and forth from a location adjacent to the edge of the shoe bottom, as the shoe is fed along during the lasting operation, and means for varying the amplitude of the reciprocating movements of said nozzle.

6. A machine for lasting with adhesive having, in combination, means for tensioning the stock to be lasted, progressively, in different locations along the marginal edge of the bottom of a shoe, means, spaced from the tensioning means in a direction lengthwise of the shoe, for pressing the lasting margin of the tensioned stock against the bottom of the shoe and for feeding the shoe, a nozzle for applying adhesive to the bottom of the shoe in the form of a thread-like portion, and means for reciprocating said nozzle in directions extending widthwise of the shoe to cause said thread-like portion of adhesive to be applied to the shoe bottom directly beneath that part of the lasting margin of the stock which extends, lengthwise of the shoe, between the tensioning means and the pressing means and along a curved line, extending back and forth from a location adjacent to the edge of the shoe bottom, as the shoe is fed along during the lasting operation.

7. A machine for lasting with adhesive having, in combination, means for tensioning the stock to be lasted, progressively, in different locations along the marginal edge of the bottom of a shoe, means, spaced from the tensioning means in a direction lengthwise of the shoe, for pressing the lasting margin of the tensioned stock against the bottom of the shoe and for feeding the shoe, a nozzle for applying adhesive to the bottom of the shoe in the form of a thread-like portion, means for reciprocating said nozzle in directions extending widthwise of the shoe to cause said thread-like portion of adhesive to be applied to the shoe bottom directly beneath that part of the lasting margin of stock which extends, lengthwise of the shoe, between the tensioning means and the pressing means and along a curved line, extending back and forth from a location adjacent to the edge of the shoe bottom, as the shoe is fed along during the lasting operation, and means for varying the amplitude of the reciprocating movements of said nozzle.

8. A machine for lasting with adhesive having, in combination, a power-operated gripper for intermittently tensioning the stock to be lasted, progressively, in different locations along the marginal edge of the bottom of a shoe, means, spaced from the gripper in a direction lengthwise of the shoe, for pressing the lasting margin of the tensioned stock against the bottom of the shoe and for feeding the shoe, a nozzle for applying adhesive to the bottom of the shoe in the form of a thread-like portion, means for reciprocating said nozzle in directions extending widthwise of the shoe to cause said thread-like portion of adhesive to be applied to the shoe bottom directly beneath that part of the lasting margin of the stock which extends lengthwise of the shoe, between the gripper and the pressing means and along a curved line, extending back and forth from a location adjacent to the edge of the shoe bottom, as the shoe is fed along during the lasting operation, and means for varying the amplitude of the reciprocating movements of said nozzle.

JOSEPH FOSSA.

REFERENCES CITED

The following references are of record in the file of this patent:

UNITED STATES PATENTS

| Number | Name | Date |
|---|---|---|
| 1,730,673 | Mell | Oct. 8, 1929 |
| 2,467,385 | Kamborian | Apr. 19, 1949 |
| 2,476,290 | Fossa | July 19, 1949 |

FOREIGN PATENTS

| Number | Country | Date |
|---|---|---|
| 450,697 | France | Jan. 25, 1913 |